(12) United States Patent
Ando et al.

(10) Patent No.: US 7,102,491 B2
(45) Date of Patent: Sep. 5, 2006

(54) DEVICE FOR DETECTING THE THEFT/THEFT OF A VEHICLE AND METHOD OF DETECTING THE THEFT

(75) Inventors: Tanichi Ando, Kawasaki (JP); Atsushi Shimizu, Moko (JP); Shinichi Mukaigawa, Kyoto (JP)

(73) Assignee: Omron Corporation, Kyoto (JP)

( * ) Notice: Subject to any disclaimer, the term of this patent is extended or adjusted under 35 U.S.C. 154(b) by 478 days.

(21) Appl. No.: 10/601,198

(22) Filed: Jun. 23, 2003

(65) Prior Publication Data

US 2005/0146422 A1    Jul. 7, 2005

(30) Foreign Application Priority Data

Jun. 24, 2002 (JP) ............................. 2002-183172

(51) Int. Cl.
*B60R 25/10* (2006.01)
*G08G 1/123* (2006.01)

(52) U.S. Cl. .................... 340/426.1; 340/988; 340/989; 342/357.01; 342/357.15; 701/207; 701/300

(58) Field of Classification Search ............ 340/426.1, 340/426.18, 426.19, 429, 988; 342/357.01, 342/357.15; 701/207, 300
See application file for complete search history.

(56) References Cited

U.S. PATENT DOCUMENTS

| | | | | |
|---|---|---|---|---|
| 5,223,844 A | * | 6/1993 | Mansell et al. | 342/357.07 |
| 6,362,736 B1 | * | 3/2002 | Gehlot | 340/568.1 |
| 6,512,465 B1 | * | 1/2003 | Flick | 340/989 |
| 6,609,064 B1 | * | 8/2003 | Dean | 701/213 |
| 6,801,853 B1 | * | 10/2004 | Workman | 701/213 |

* cited by examiner

*Primary Examiner*—Jeffery Hofsass
*Assistant Examiner*—Samuel J. Walk
(74) *Attorney, Agent, or Firm*—Foley & Lardne LLP

(57) ABSTRACT

A theft detecting device has a position data-obtaining and communication arrangements which are energized after it is determined that "the automobile is stolen and is now in a stationary state" based on the signals from a state detecting means and time counter means. The communication arrangement transmits a theft notice data inclusive of the obtained position data to the owner and the like that are remote from the automobile or the like which has been stolen. After the data have been transmitted, the power source of the position data-obtaining means is again turned off to conserve battery power.

8 Claims, 12 Drawing Sheets

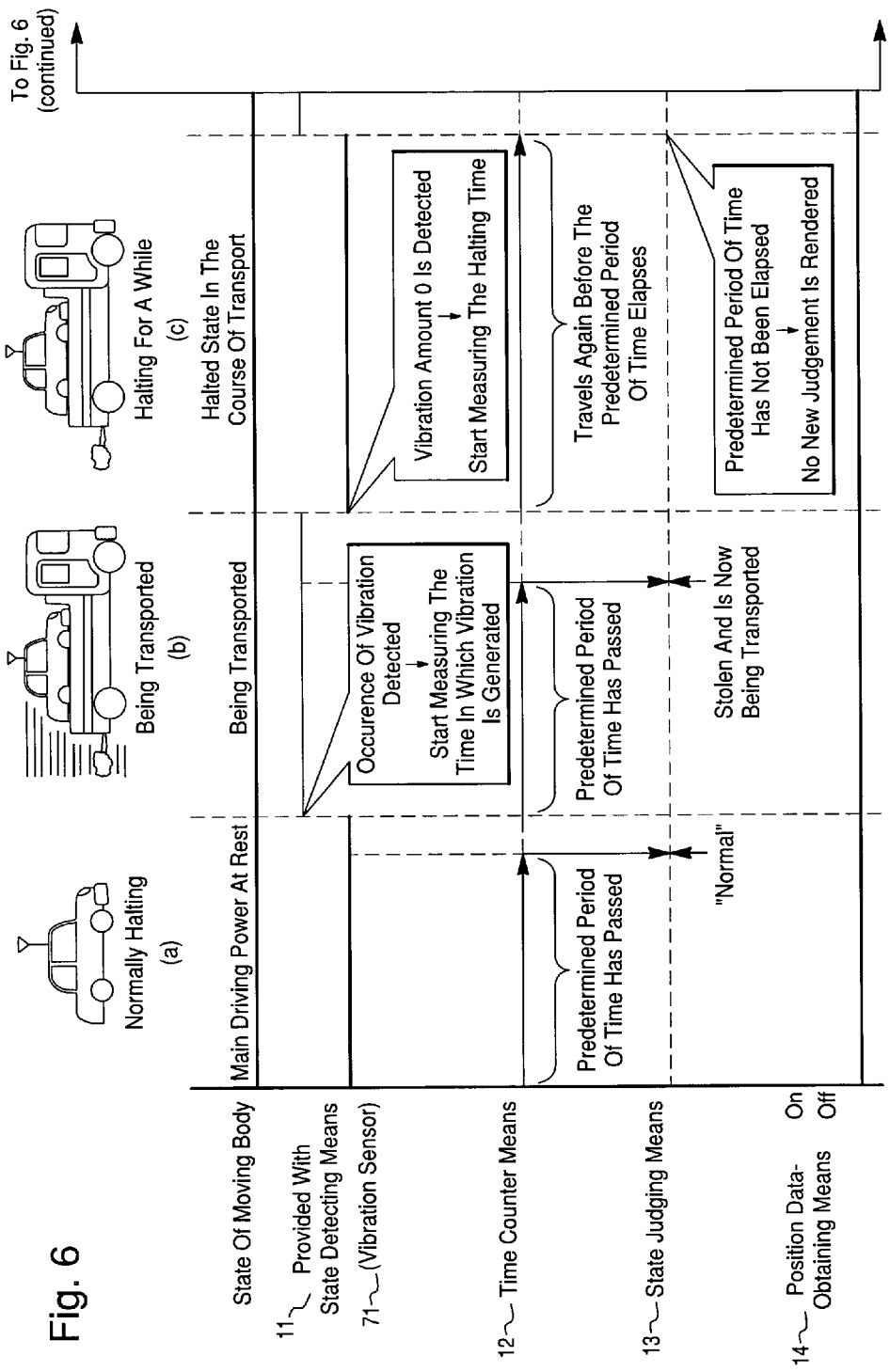

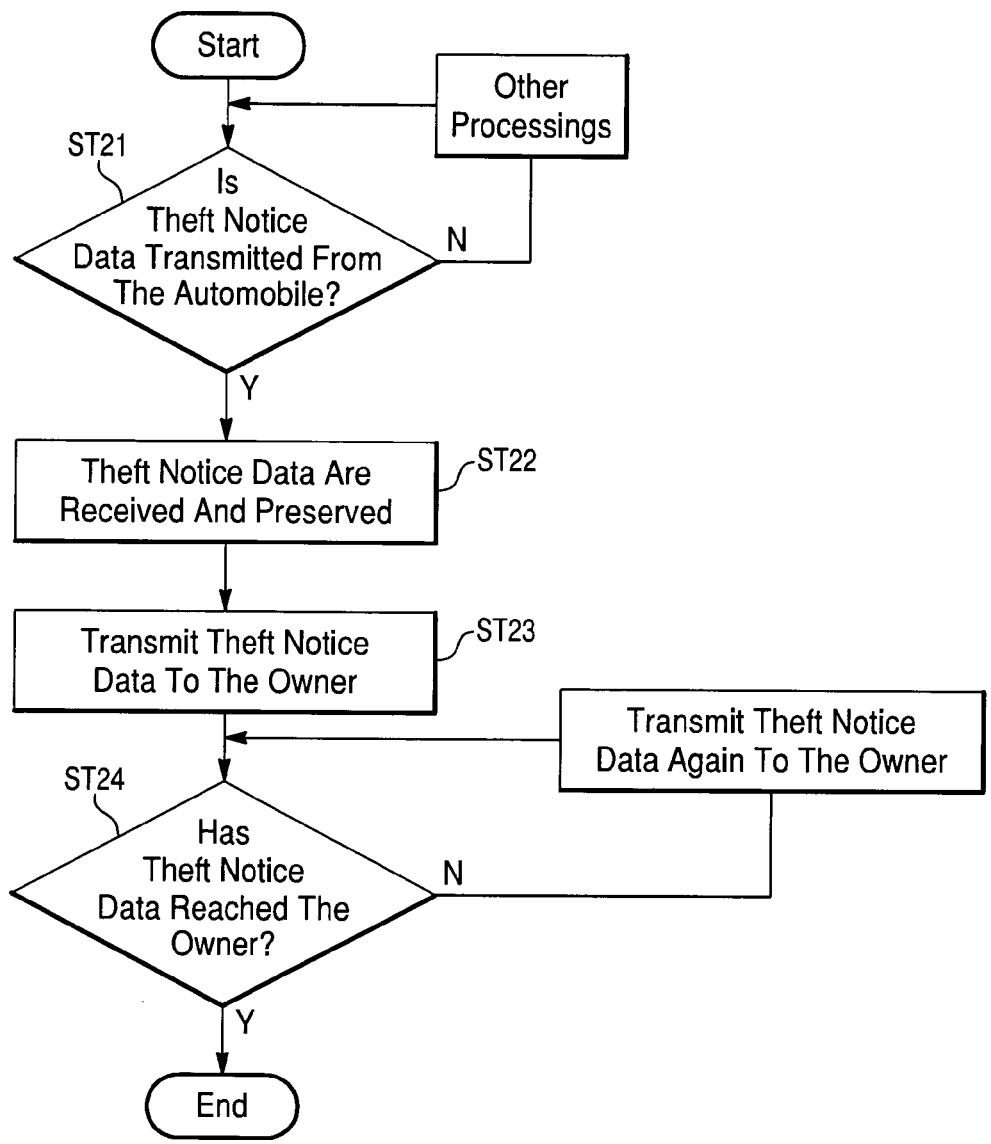

DEVICE FOR DETECTING THE THEFT/THEFT OF A VEHICLE AND METHOD OF DETECTING THE THEFT

BACKGROUND OF THE INVENTION

1. Field of the Invention

This invention relates to a method and device for detecting the theft of a vehicle, that functions when a vehicle such as an automotive vehicle or the like type of mobile member/device, is stolen and is transported in a state where the main driving power is at rest (viz., the engine/motor is not running) and for detecting when the transportation of the stolen vehicle terminates.

2. Description of the Related Art

There have heretofore been proposed a variety of locks and alarm devices for detecting the theft of moving bodies such as automotive vehicles. However, in the event that these devices are deactivated when the vehicle is stolen, it is impossible to subsequently locate the vehicle after it has been driven or transported to another location.

In recent years, however, it has been made possible, as shown in FIG. 1, to specify the position of a mobile/moving body (hereinafter vehicle) by utilizing a GPS (global positioning system) as a position data-obtaining arrangement/means 14, along with a theft detector device which also utilizes the GPS.

To specify the location of the vehicle utilizing the GPS, however, it is essential that the vehicle 1 itself, includes the position data-obtaining means 14 that is capable of obtaining the necessary data related to the location of the vehicle from position data-offering means 50 (such as GPS satellite) and that the position data-obtaining means 14 is in operation. To operate the position data-obtaining means 14, a large amount of electrical power is necessary and, hence, it is a prerequisite that the main driving power 3 of the vehicle is usually in operation (the engine is running). However, the vehicle that is being stolen does not necessarily have its engine running, that is to say, does not have the main driving power 3 in operation, and is often transported with its main driving power at rest, by using a transporter such as a truck, a tow truck, a car carrier or the like.

In order to operate the position data-obtaining means in a state where the main driving power of the vehicle is at rest, there is no alternative but to directly supply electric power to the position data-obtaining means from a battery 4 of the vehicle. Therefore, if the position data-obtaining means 14 is maintained in operation at all times even when the main driving power 3 of the vehicle 1 is at rest, electric power continues to be consumed at all times even while the vehicle is parked for extended periods of time thus inducing the problem of completely discharging the battery 4.

FIG. 2 shows an arrangement for solving this problem. There has been proposed a device for detecting the theft as taught in, for example, Japanese Patent No. 2665478. Namely, in case an abnormal condition such as the theft of the vehicle is detected in a state where the vehicle 1 is parking for extended periods of time with the main driving power 3 at rest, the electric power is supplied from a battery 4 to a unit (e.g., navigation ECU) that corresponds to position data-obtaining means 14 to obtain the data related to the position of the vehicle, and the obtained data of position is transmitted from communication means 15 to the owner of the vehicle or to a security company (hereinafter referred to as owner or the like) via a data intermediation unit 30. Namely, according to the above prior art, the electric power is not constantly supplied to the position data-obtaining means 14 in a state where the main driving power 3 of the vehicle 1 is at rest but, instead, the electric power is supplied only at selected times when abnormal condition such as the theft or the like is detected by the theft detector arrangement, to suppress-attenuate the discharge of the battery 4.

According to the prior art (1) shown in FIG. 1, however, the electric power is supplied to the position data-obtaining means 14 at all times, even in a state where the main driving power is at rest. Even according to the prior art (2) shown in FIG. 2, the electric power is maintained supplied to the position data-obtaining means 14 after the abnormal condition is detected arousing a problem in that the electric power of the battery 4 continues to be drained and the battery is quickly discharged. If this known position data-obtaining means 14 is used, the battery 4 tends to be discharged in several hours on average after it has started operating, whereby the position data-obtaining means 14 no longer continues to function, making it impossible to obtain or transmit the data related to the position of the vehicle 1 that is stolen/stolen.

What is important in case the vehicle 1 is stolen is that the position of the vehicle 1 is reliably transmitted to the owner and the like, so that the owner and the like may recover the vehicle. At present where systematic thefts are rampant, several days or longer are, in many cases, required before the vehicle can be located after the occurrence of the theft. Therefore, it is a problem if the battery 4 becomes discharged in a number of hours following the theft and the position data-obtaining means no longer works. Further, in order to discover the vehicle 1 that is stolen, it is important to know the position where the vehicle has finally stopped moving after having been transported rather than to be informed of the constantly changing position of during the transport.

SUMMARY OF THE INVENTION

The embodiments of the invention were developed in view of the above problems, and seek to provide a device for detecting the theft, which actuates the position data-obtaining means 14 in a state where the main driving power is at rest after it being determined that the vehicle 1 has been stolen, transported and is, then, no longer being transported, in order to obtain the position data of the vehicle even when long periods of time have passed from the occurrence of theft and to transmit the data to the owner and the like minimizing the discharge of the battery 4.

An embodiment of the invention is directed to a device for detecting the theft of a movable member that is stolen using a transporter for transporting the movable member in a state where the main driving power of the movable member is at rest, the device for detecting the theft comprising: a state detecting arrangement for detecting a parameter indicative of the movable member is being transported or is stationary; a state judging arrangement for judging the state of the movable member based on signals from the state detecting arrangement; a position data-obtaining arrangement for obtaining the position data of the movable member from a unit outside of the movable member when the state judging arrangement has judged that the movable member is transported with its main driving power at rest and is, then, transported no more; and a communication arrangement for transmitting the position data that is obtained to the unit outside of the movable member.

This arrangement makes it possible to determine not only the occurrence of the theft of the vehicle but also the fact that the vehicle that is stolen is being transported and has then ceased to be transported. In response to this the position data-obtaining arrangement/means is activated after stolen vehicle is transported and is, then, transported no more. Even after a considerably long periods of time have passed from the occurrence of the theft, therefore, the discharge of the battery is minimized, and the position data of the vehicle is obtained and is transmitted to the owner and the like. The position data highly probably represents the position where the stolen vehicle is kept rather than a place where the vehicle has temporarily stopped because of a traffic signal or a place where a thief has stopped temporarily such as to take a rest, and helps quickly and correctly recover the vehicle that is stolen.

In the above embodiment of the invention, the state detecting arrangement includes: a transport detecting arrangement capable of detecting whether the movable member is being transported or is stationary and producing an output indicative thereof, and a time counter function, and wherein: the state detecting arrangement determines that the transportation has ceased when a predetermined period of time has passed from the time that the output of the transport detecting arrangement assumes a zero value.

In this invention, the state detecting arrangement/means is one which detects the level of vibration, shock or acceleration that occurs when, for example, the vehicle is being transported or is brought to a halt, starts measuring the passage of time by time counter means after the value detected by the detecting means has become 0 (zero), and judges that the transport has finished when a predetermined period of time has passed. This constitution makes it possible to correct detect the vehicle that is being transported or is stationary.

According to an exemplary embodiment of the invention, provision is made of means for judging that the transport has finished by using at least two or more detection methods in combination. This arrangements renders it possible to more correctly detect the vehicle that is being transported or is stationary.

A further embodiment of the invention resides in a method of detecting the theft of a movable member that is stolen using a transporter for transporting the movable member in a state where the main driving power of the movable member is at rest, comprising: detecting a parameter indicative of the movable member being transported or being stationary using a state detecting arrangement; obtaining position data of the movable member from a position data-obtaining arrangement from a unit outside of the movable member when it is determined by the state judging arrangement that the movable member is transported with its main driving power at rest and is, then transported no more, based on the detected parameter; and transmitting the obtained position data using the communication arrangement to a unit outside of the movable member.

In general, it is desired that the position data transmitted to a unit outside of the vehicle are transmitted to the owner's terminal through a data intermediation unit outside of the vehicle.

Upon arranging the invention in this manner, the data related to a position where the vehicle is finally disposed after having been transported, is transmitted to the owner and the like even in case the vehicle is stolen with its main driving power being at rest. Therefore, it becomes highly probable that the owner and the like will reliably recover the vehicle and take suitable countermeasures.

BRIEF DESCRIPTION OF THE DRAWINGS

FIG. 11 is a flowchart illustrating a processing of the data intermediation unit.

DESCRIPTION OF THE EXEMPLARY EMBODIMENT

An embodiment of the device for detecting the theft of the vehicle of the invention will now be described with reference to FIGS. 3, 4, 5 and 6. In the following embodiment, the vehicle is described as being an automobile. However, the invention is in no way limited to automotive vehicles and can be applied to any device or arrangement which has a main driving power 3 (e.g., a source of motivation such as a motor or engine) and a battery 4, and is capable of being moved in a manner which permits it to be stolen. In addition to automobiles, the invention may cover, for example, motorcycles, heavy machinery for construction, motorboats, etc.

Figure 1:
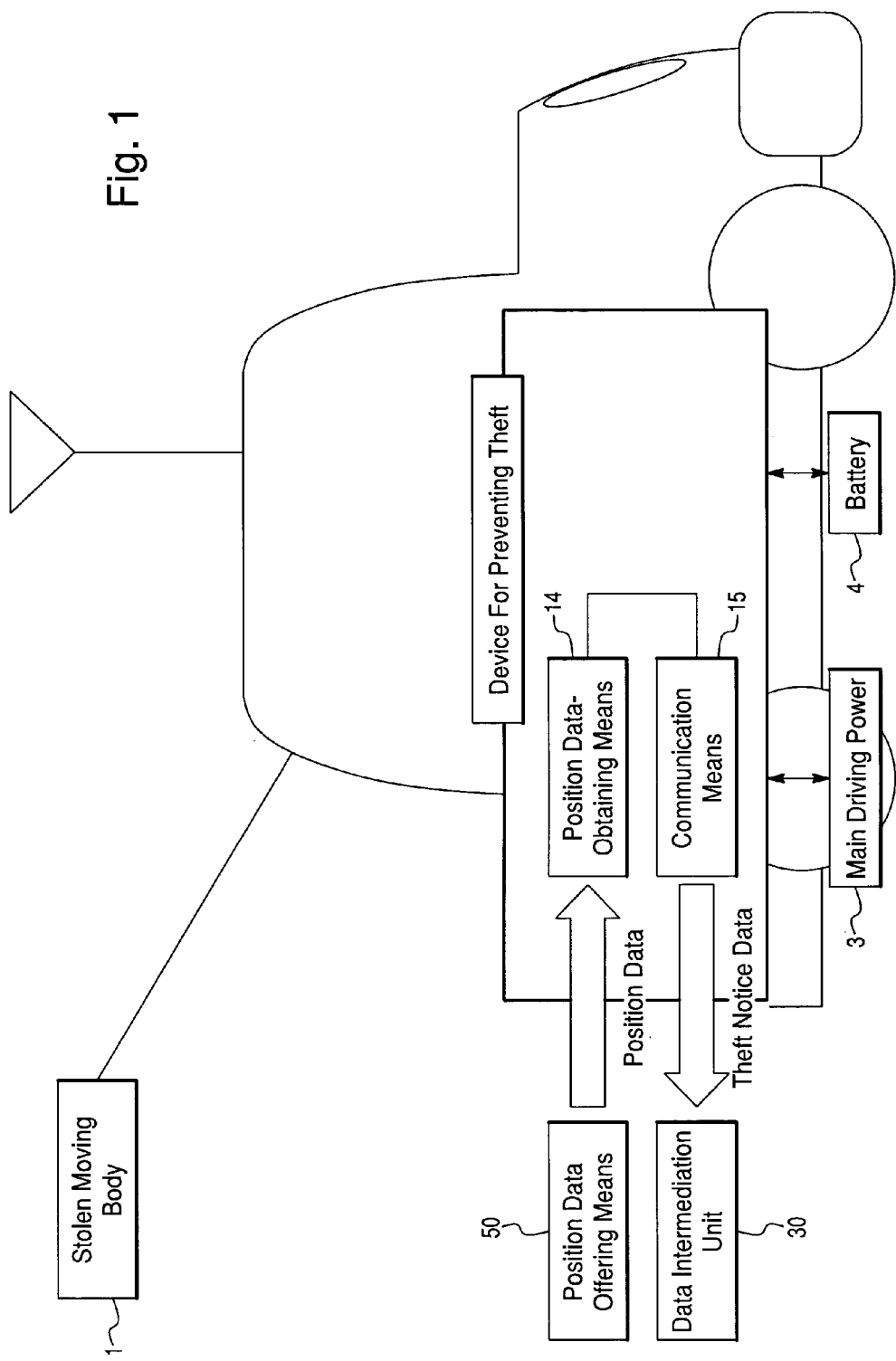
FIG. 1 is a diagram illustrating a device for detecting a theft according to a prior art (1)
Figure 2:
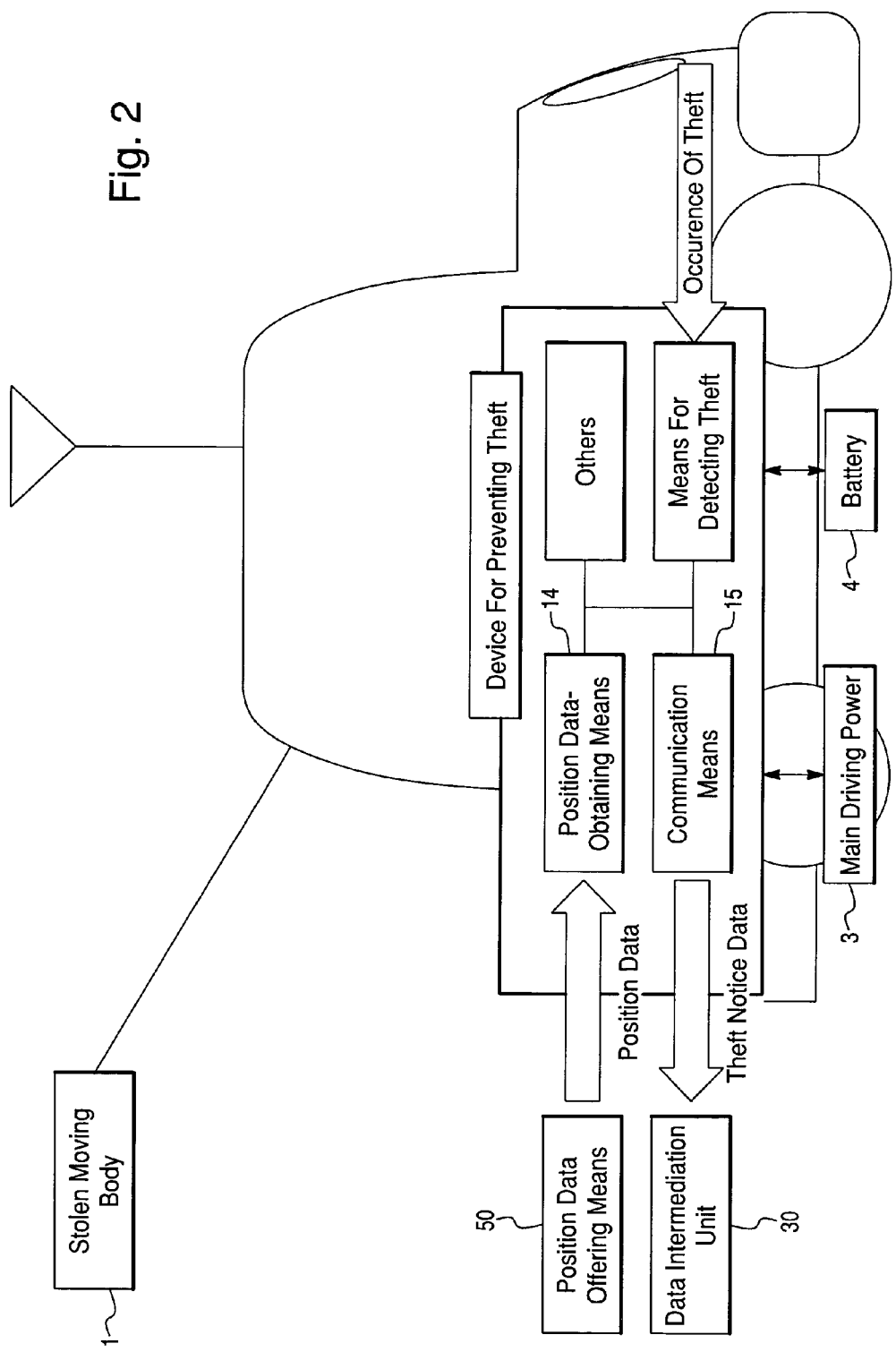
FIG. 2 is a diagram illustrating a device for detecting a theft according to a prior art (2)
Figure 3:
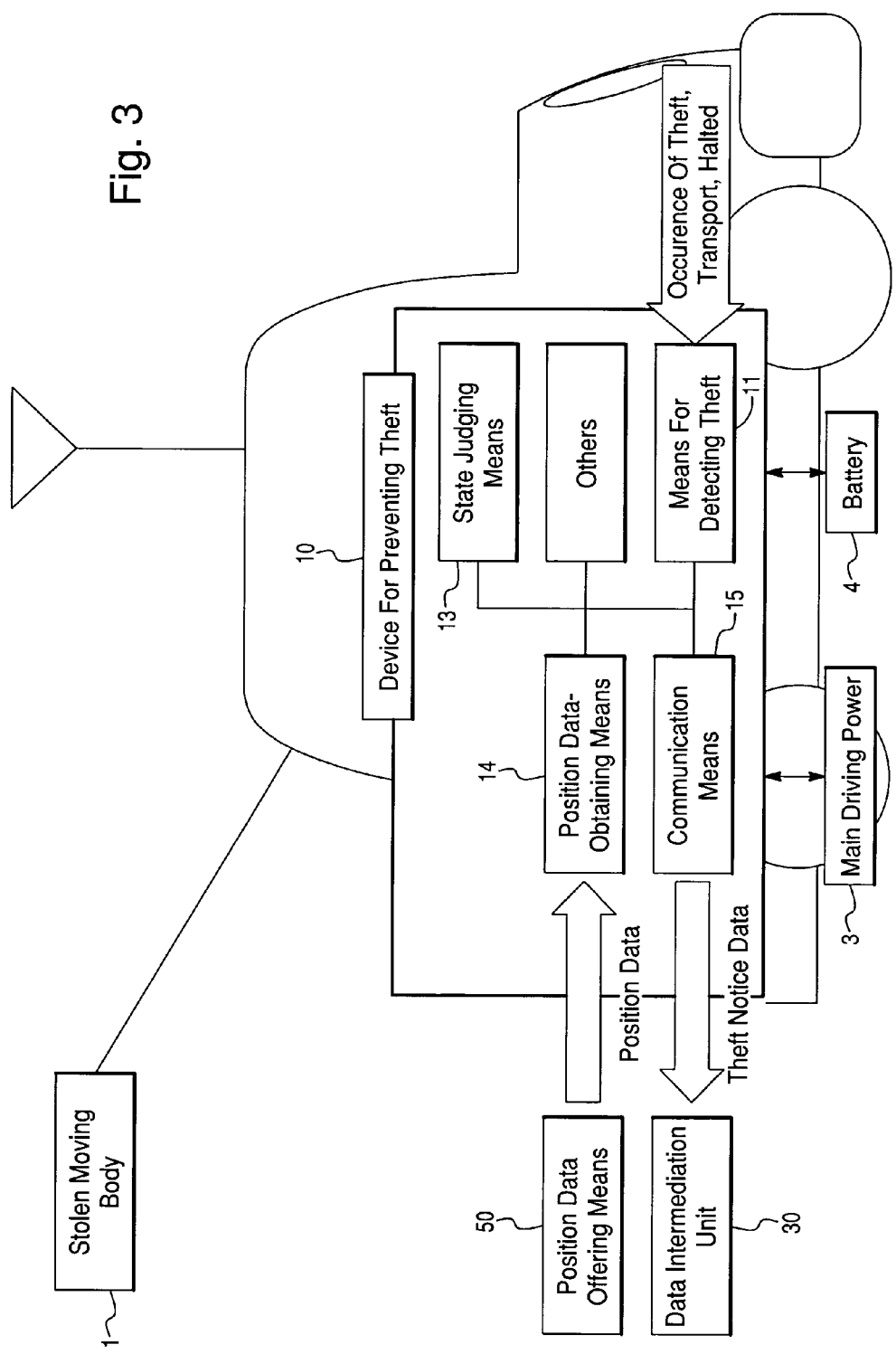
FIG. 3 is a diagram schematically illustrating a device for detecting a theft according to this invention.

The device for detecting the theft is comprises, as schematically illustrated in FIG. 3, by a device 10 for detecting the theft that includes state detecting means 11, state judging means 13, position data-obtaining means 14 and communication means 15; and a car 1 including a main driving power (e.g. engine/motor) 3 and a battery 4. The device 10 for detecting the theft is directly connected to the battery 4 so as to be operated even in a state where the engine 3 of the vehicle 1 is at rest (Viz., is off and not operating).

Figure 4:
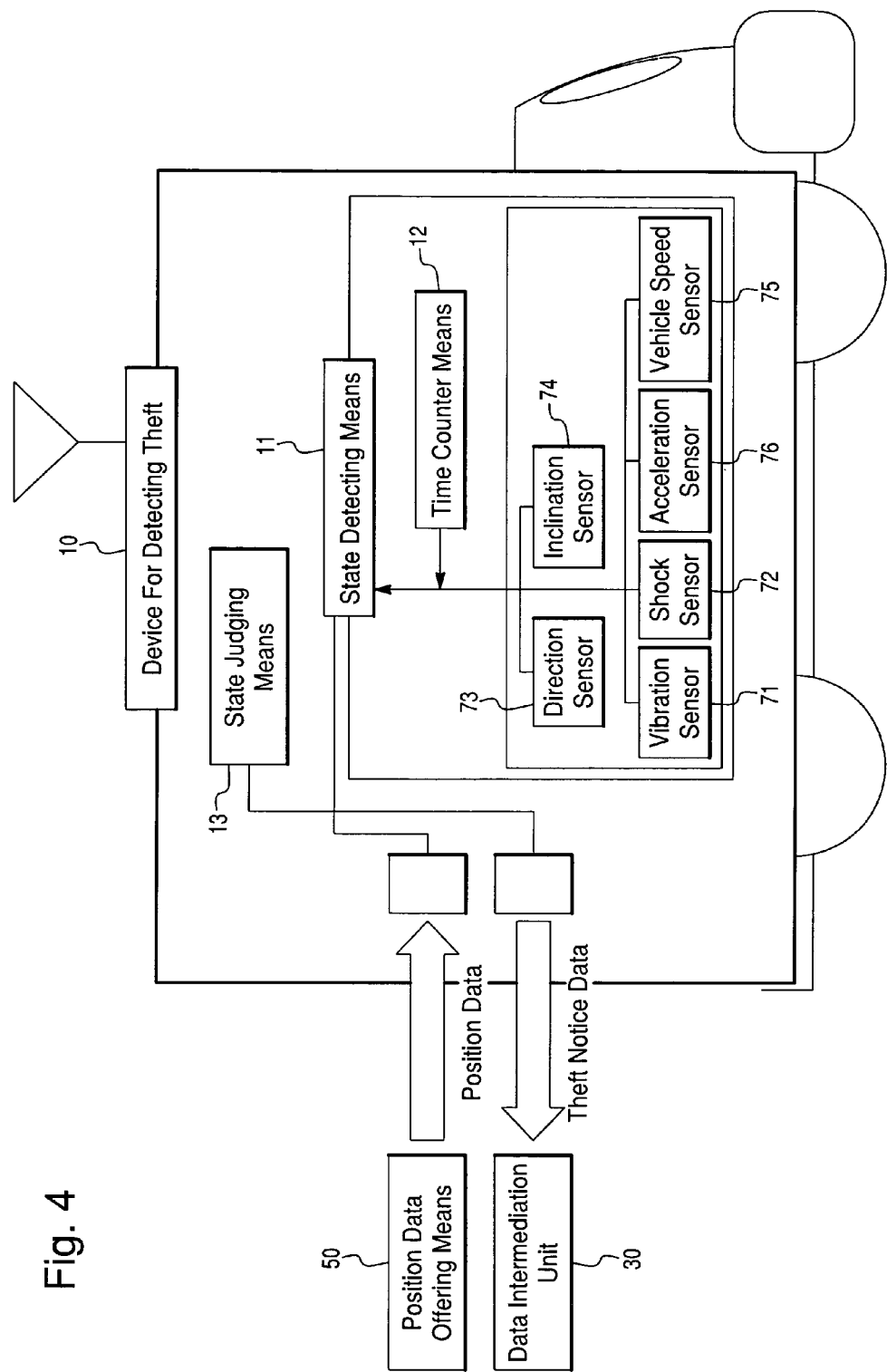
FIG. 4 is a diagram schematically illustrating state detecting arrangement/means in the device for detecting the theft.

FIG. 4 illustrates an arrangement of the state detecting arrangement/means 11 in FIG. 3. As a method of detecting the state, it is possible to use a shock sensor 72, a direction sensor 73, an inclination sensor 74, a vehicle speed sensor 75 and an acceleration sensor 76, in addition to the vibration sensor 71. The state detecting arrangement/means 11 is constituted by these sensors and a time counter means 12.

Figure 5:
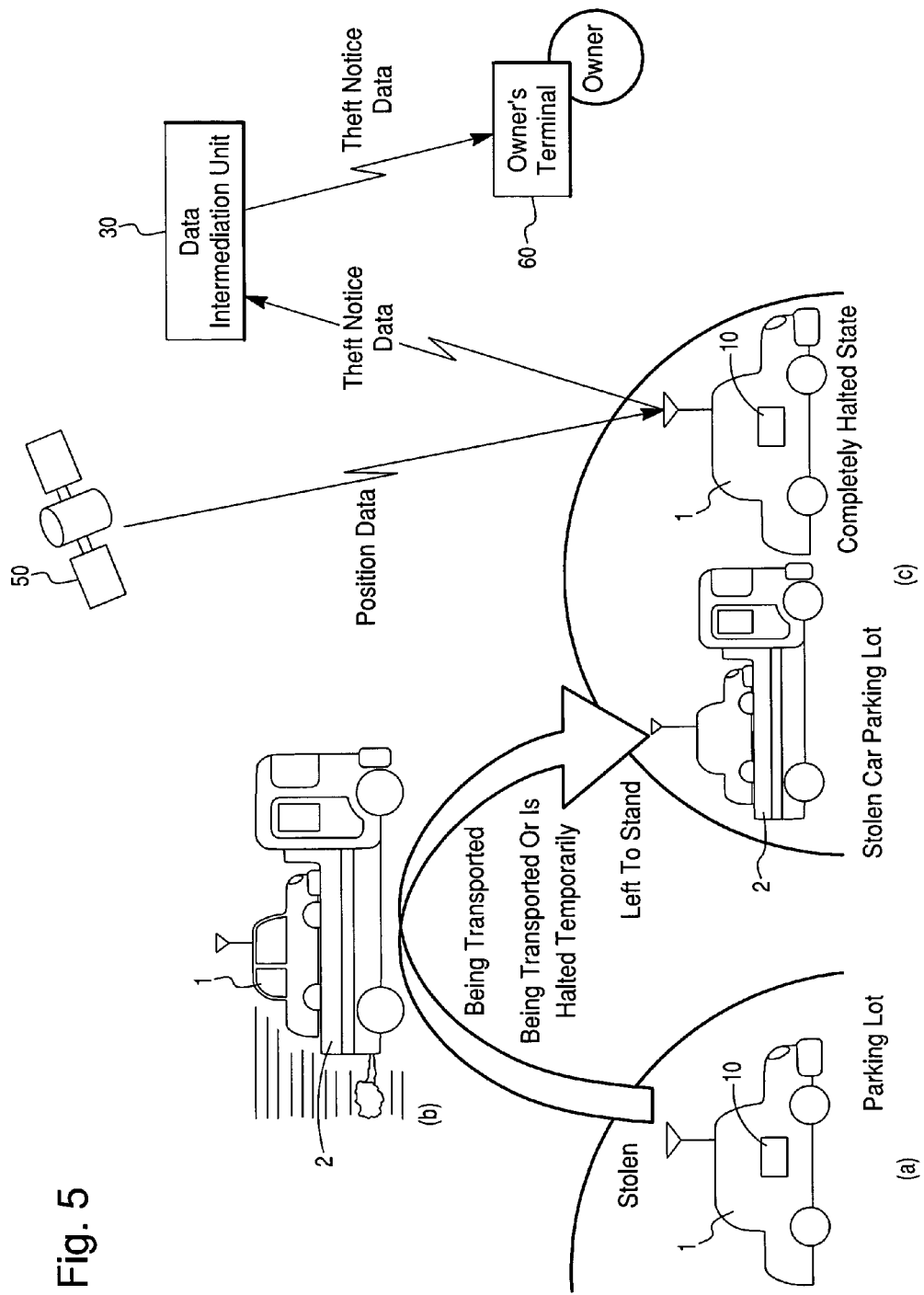
FIG. 5 is a diagram schematically illustrating a method of detecting the theft according to the invention.

Described below with reference to FIG. 5 are an example of a shift of a state from the occurrence of the theft through the transport up to a completely stationary state after the end of transport according to a method according to the invention for detecting the theft, and an example of a unit outside of the automobile according to the method of detecting the theft. The automobile 1 that is parked (see (a) in FIG. 5) is moved by a transporter 2 such as a car carrier in the manner depicted in (b) in FIG. 5, until it finally arrives at a place where the stolen cars are stored and is brought into a halt as shown (c) of FIG. 5.

The unit outside of the automobile for informing the owner of the position of the automobile 1 that is completely stationary, is constituted by position data offering arrangement/means 50, a data intermediation unit 30 for transmitting the position data of the automobile 1 emitted from the theft detector device to the owner or the like, and an owner's terminal 60 that receives the position data through the data intermediation unit 30.

Figure 6:
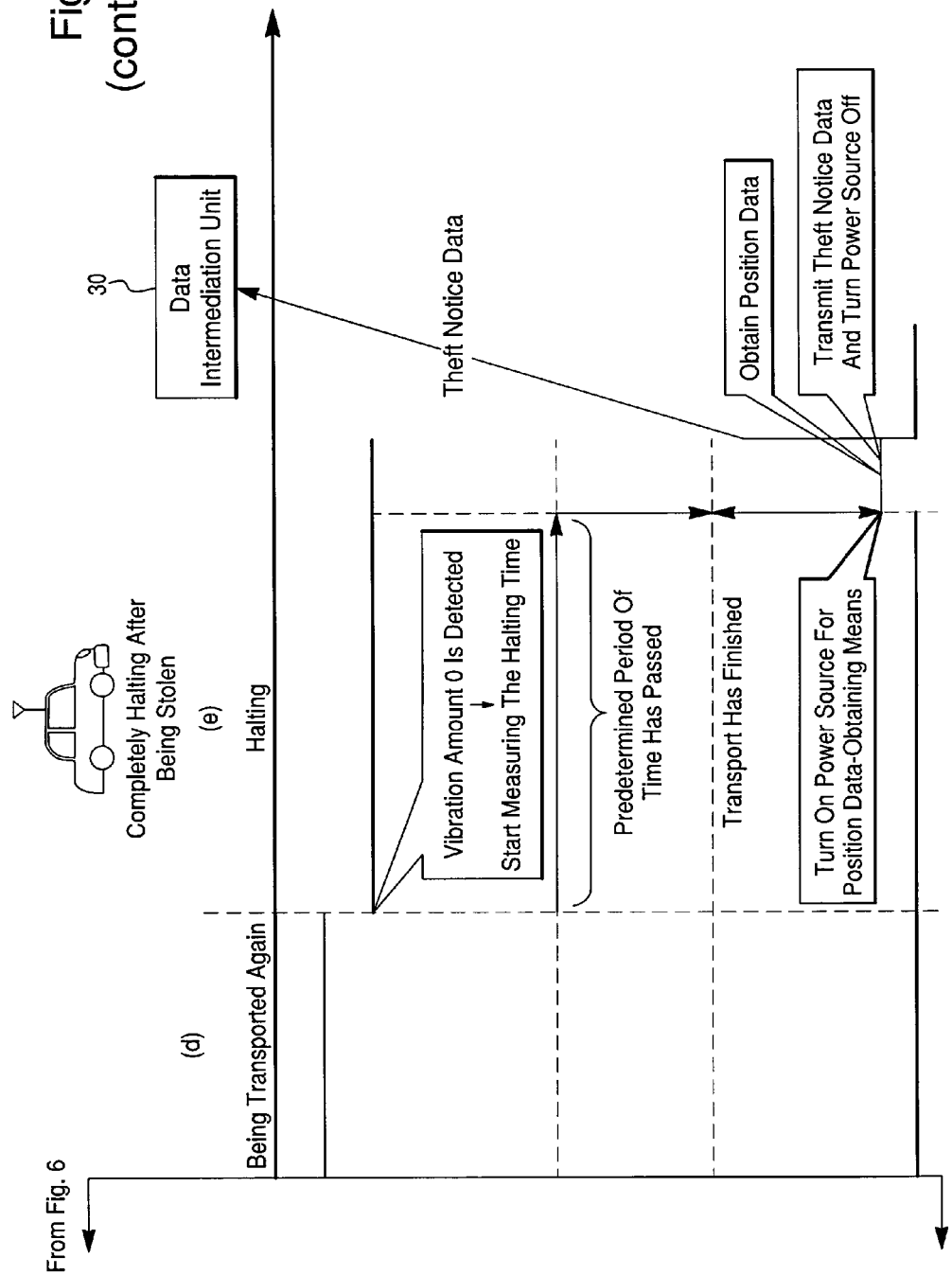
FIG. 6 is a timing chart illustrating the operation of an embodiment of the system according to the present invention.

The operation of the system for detecting the theft will be described next with reference chiefly to a timing chart of FIG. 6. The state detecting means 11 is hereinafter described as using a vibration sensor 71.

In a state where the engine of the automobile 1 is at rest (stationary), the vibration sensor 71 (of the state detecting means 11), time counter means 1 2 and state judging means 13 are activated among the constituent elements of the device 10 for detecting the theft, and are monitoring the state of the automobile 1. At this moment, the vibration sensor 71 is producing "vibration amount 0 (zero)," and the time counter means 12 is counting the time in which the vibration sensor 71 is producing the vibration amount 0, and produces an output. When no vibration occurs after the engine has once been stopped and a state of vibration amount 0 has continued for a predetermined period of time (e.g., 30 minutes), the state judging means 13 renders the judgement "normal" (state (a) of FIG. 6).

If the automobile 1 is transported by some means with its engine at rest (transported state), vibration which is imparted to the car carrier 2 from the road during the transport and the vibration of the engine of the car carrier 2 are transmitted to the automobile 1. Therefore, the vibration sensor 71 detects the vibration that is transmitted and produces a signal representing "vibration amount other than 0," i.e., a signal different from the one which should be produced while automobile is stationary. Time counter means 12 is counting the time in which the "vibration amount other than 0" is being produced. When the state detecting means 11 continues to produce the "vibration amount other than 0" for longer than a predetermined period of time, the state judging means 13 judges that "the automobile is now being stolen and transported" (states (b) and (d) of FIG. 6). When the vehicle temporarily stops because of a traffic signal, the automobile 1 is stationary but the vibration of the engine of the car carrier 2 continues to be transmitted to the automobile 1, and the vibration sensor 71 continues to produce signals representing the "vibration amount other than 0." Whenever the automobile 1 is being transported, however, it does not mean that the vibration sensor 71 continues to produce the vibration amount other than 0 at all times. For example, when the engine of the car carrier 2 is temporarily stopped for a while, the vibration is not transmitted to the automobile 1 for the same period. However, even during this period, the time counter means 12 continues to count the time in which the vibration sensor 71 is producing the vibration amount 0. As soon as the car carrier 2 moves again, vibration is again transmitted to the automobile 1. Therefore, so long as the time for which the vibration amount remains at 0 is less than a predetermined period of time, the state judging means 13 does not time out and render a new judgement (state (c) of FIG. 6).

When the transportation of the stolen vehicle is completed with the transport having arrived at a destination the judgement being that "the vehicle is stolen and is being transported" all the while, the automobile 1 is unloaded from the car carrier 2 and becomes stationary. From this time, the vibration sensor 71 continues to produce the "vibration amount 0" again, and the time counter means 12 counts the time in which the vibration sensor 71 continues to produce the vibration amount 0. When the state of vibration amount 0 continues for more than a predetermined period of time, the state judging means 13 determines that "transport of the automobile 1 has finished." Electric current is then supplied to the position data-obtaining means 14 and to the communication means 15 to energize them for the first time when it is so judged that "the automobile is stolen and is being transported" and that "the transport has finished," whereby the position data-obtaining means 14 obtains the position data of the automobile 1 from the position data offering means 50. Thereafter, the theft notice data including the position data obtained through the communication means 15 are transmitted to the data intermediation unit 30 outside of the automobile 1 (state (e) of FIG. 6). It is desired that the power source of the position data-obtaining means 14 is readily turned off after the data has been transmitted.

As described above, the vibration sensor 71, time counter means 12 and state judging means 13 only are operated consuming small amounts of electric power while the automobile 1 that is stolen is being transported, and the position data-obtaining means 14 that consumes large amounts of electric power is operated, for the first time, when the automobile 1 arrives at the destination of transport to minimize the discharge of the battery 4, so that the position data of the stolen automobile 1 can be reliably obtained even after it was transported for extended periods of time and that the owner and the like will be able to discover the automobile 1.

Though this embodiment has used the vibration sensor 71 in the state detecting means 11, it is possible to use any other vibration detecting means provided it is capable of detecting the state of transporting the automobile 1 or the state of completion of the transport. In addition to the vibration detecting means, it is also possible to use shock detecting means (e.g., shock sensor 72), direction detecting means (e.g., direction sensor 73), inclination detecting means (inclination sensor 74), speed detecting means (e.g., speed sensor 75) and acceleration detecting means (e.g., acceleration sensor 76). For example, the shock sensor 72 detects the shock transmitted to the automobile 1 caused by knocking/bumps from the road surface during the transport, the direction sensor 73 detects a change in the direction of the automobile 1 during the transport, the inclination sensor 74 detects a change in the inclination of the automobile 1 (flat road, sloping road) during the transport, the speed sensor 75 detects the speed of the automobile due to the revolution of wheels of when the front wheels or the rear wheels of the automobile 1 are rotated in contact with the road surface as the automobile 1 is towed by, for example, a tow truck, and the acceleration sensor 76 detects the moving or stationary state of the automobile 1 by detecting the acceleration that generates in the automobile 1 during the transport. Sensors other than the speed sensor 75 are capable of detecting the moving or stationary state of the automobile 1 even when the wheels of the automobile 1 are not in contact with the ground surface like when being carried by the car carrier 2. These sensors need not be used alone and can be used in combination to produce detection signals, so that the state judging means 13 is allowed to more correctly judge the transportation state of the automobile 1 or the state where the transport is finished.

By using the acceleration sensor and the vibration sensor in combination, for example, the vibration conducted to the automobile 1 and acceleration are detected; i.e., the vibration sensor 71 is used for judging the completion of transport by detecting the vibration of the engine of the car carrier/ transport 2, and the acceleration sensor 76 is used for judging that the automobile 1 is being transported by detecting the acceleration of the automobile 1 during the transport. Thus, by utilizing the different parameters which are sensed by the sensors, it is possible to more correctly detect and judge the state of transport or the end of transport.

The state detecting means is in no way limited to the above sensors, and any means or arrangement may be used provided it is capable of detecting the transport of the automobile 1 or the end of transport.

Elements constituting the system for detecting the theft will now be described in detail.

Figure 7:
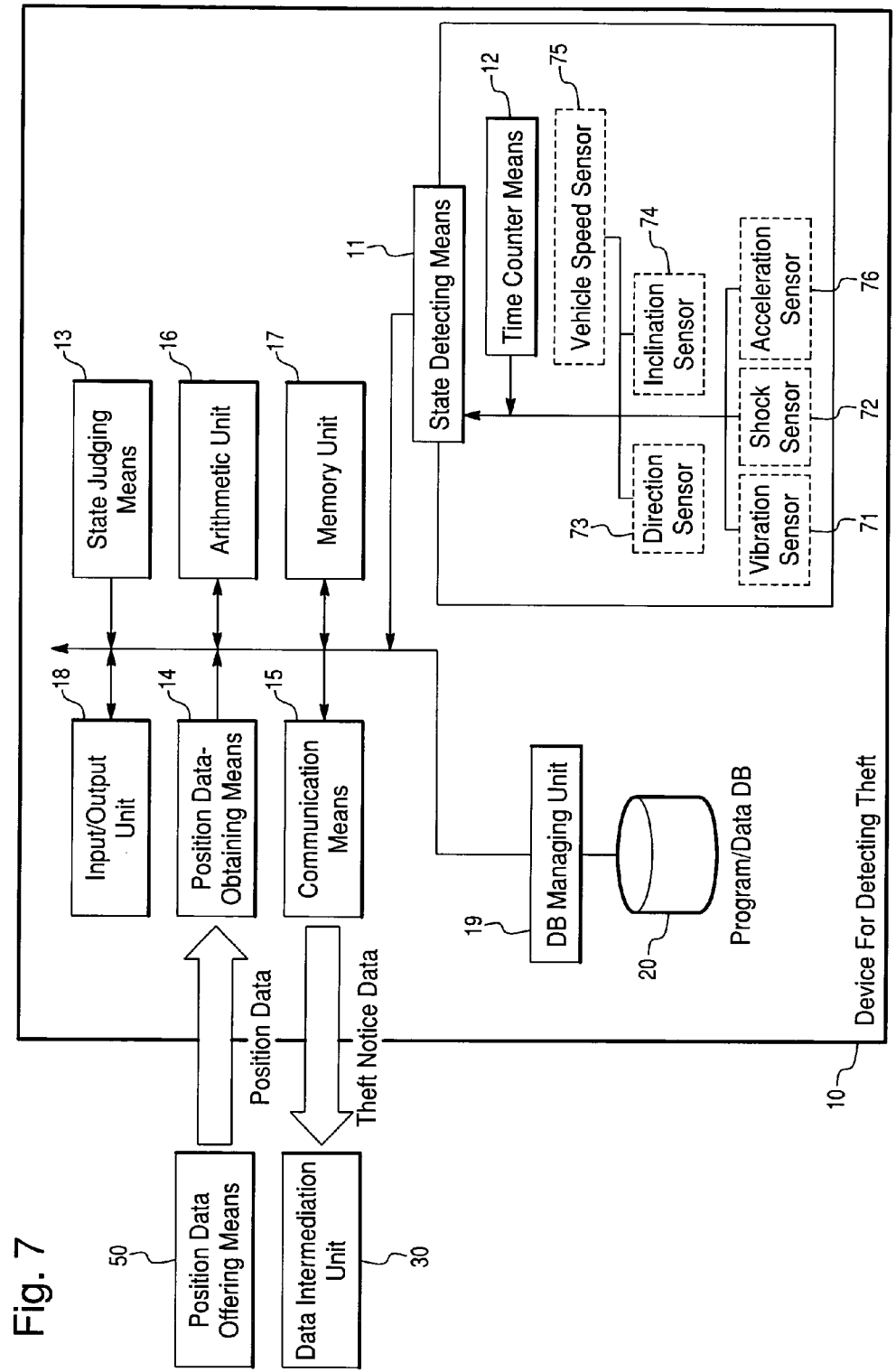
FIG. 7 is a block diagram of a device for detecting theft.

FIG. 7 is a block diagram of the device 10 for detecting the theft. The device 10 includes the constituent elements as shown, which are connected together through a bus. An arithmetic unit 16 comprises a CPU, and executes programs and controls the input and output. A memory unit 17 is constituted by either a volatile memory or a nonvolatile memory, and stores programs to be executed as well as parameters. An input/output unit 18 is a display device for setting and confirming the devices, an input device such as a keyboard, a reading unit such as CD-ROM or a DVD for inputting and outputting external programs, or a serial interface. The units and devices for the input/output unit 18 may share those devices used by a car navigation system.

A DB (database) management unit 19 is constituted by a memory device such as a magnetic disk, a nonvolatile memory or a memory capable of holding data for extended periods of time being powered by a back-up cell, and controls the input and out to and from the memory device in response to a request for reading from the arithmetic unit 16.

A program/data DB 20 is storing processing programs for communication and for judging the state of the automobile 1.

The state detecting means 11 is constituted by various sensors such as the vibration sensor 71 that detects whether the automobile 1 is being transported or is stationary in a state where the engine of the automobile 1 is at rest and produces a signal depending upon the amount of detection, the shock sensor 72, the direction sensor 73, the inclination sensor 74, the speed sensor 75, the acceleration sensor 76, and time counter means 12. The time counter means 12 measures the time in which the signal is output from the state detecting means 11. The state judging means 13 judges that "the automobile is stolen and is being transported," "the transport has been finished," etc. depending upon a signal output from the state detecting means 11 and upon a time signal output from the time counter means 12.

It is desired that the position data-obtaining means 14 includes a GPS receiver or a PHS/cell phone for obtaining the position data of the automobile 1 from the position data offering means 50 such as a GPS satellite or a ground station for PHS/cell phones. This makes it possible to obtain position data of vehicle anywhere in the country irrespective of the different districts/areas.

Communication means 15 can include a cell phone circuit including transmission means and reception means, or a PHS circuit or a particular small-power wireless system, which transmits the theft notice data inclusive of the obtained position data to the data intermediation unit 30 outside of the automobile 1.

Figure 8:
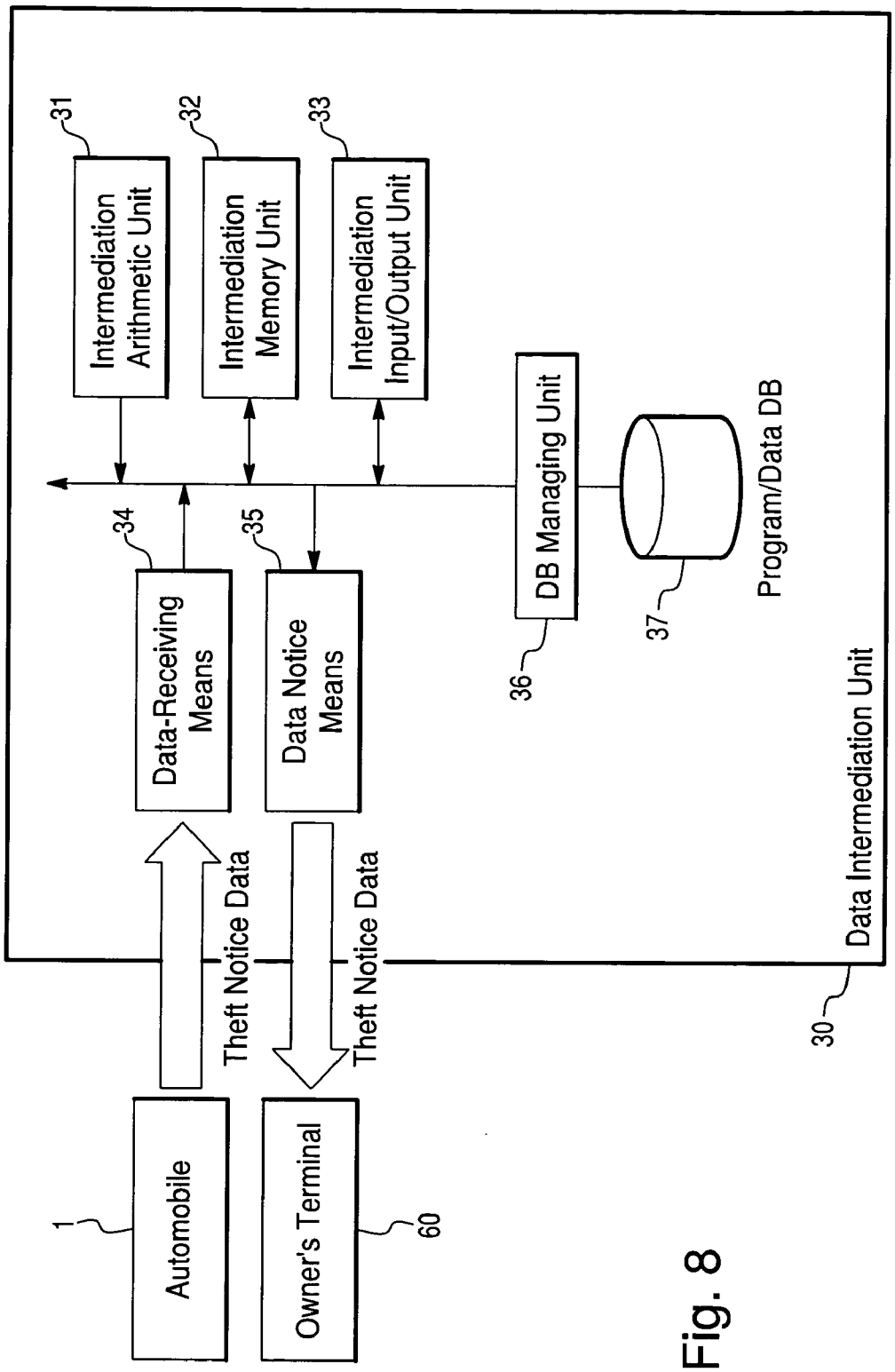
FIG. 8 is a block diagram of a data intermediation unit.

FIG. 8 is a block diagram of the data intermediation unit 30 that receives the theft notice data inclusive of the position data transmitted from the device 10 for detecting the theft mounted on the automobile 1. The data intermediation unit 30 includes constituent elements as shown, which are connected together through a bus. An intermediation operation unit 31 is constituted chiefly by a CPU, and executes programs and controls the inputs and outputs. An intermediation memory unit 32 is constituted chiefly by a volatile memory and stores an execution program. An intermediation input/output unit 33 is a display device for setting and confirming the devices, an input device such as a keyboard, a reading device such as CD-ROM or a DVD for inputting and outputting an external program, or a serial interface.

An intermediation DB (database) managing unit 36 comprises a memory device such as a magnetic disk, a nonvolatile memory or a memory capable of holding the storage for extended periods of time being powered by a back-up cell, and controls the input and out to and from the memory device in response to a request for reading from the intermediation operation unit 31. A program for processing the theft notice data is stored in a program/data DB 37.

Data receiving means 34 is an input unit for receiving the position data transmitted from the automobile 1, and is a telephone circuit, a radio receiver, or an internet connection port. Data notice means 35 is for transmitting data to an owner's terminal 60, takes a form that varies depending upon the form of the owner's terminal 60, and is a telephone circuit including a cell phone, a wireless transmitter or an internet connection port. The owner's terminal 60 is a telephone, a cell phone or an internet data terminal. The data intermediation unit 30 has a function of a server, stores and preserves, in the program/data DB 37, the theft notice data received from the automobile 1, and is capable of responding to a call related to the theft notice data from the owner and the like.

Figure 9:
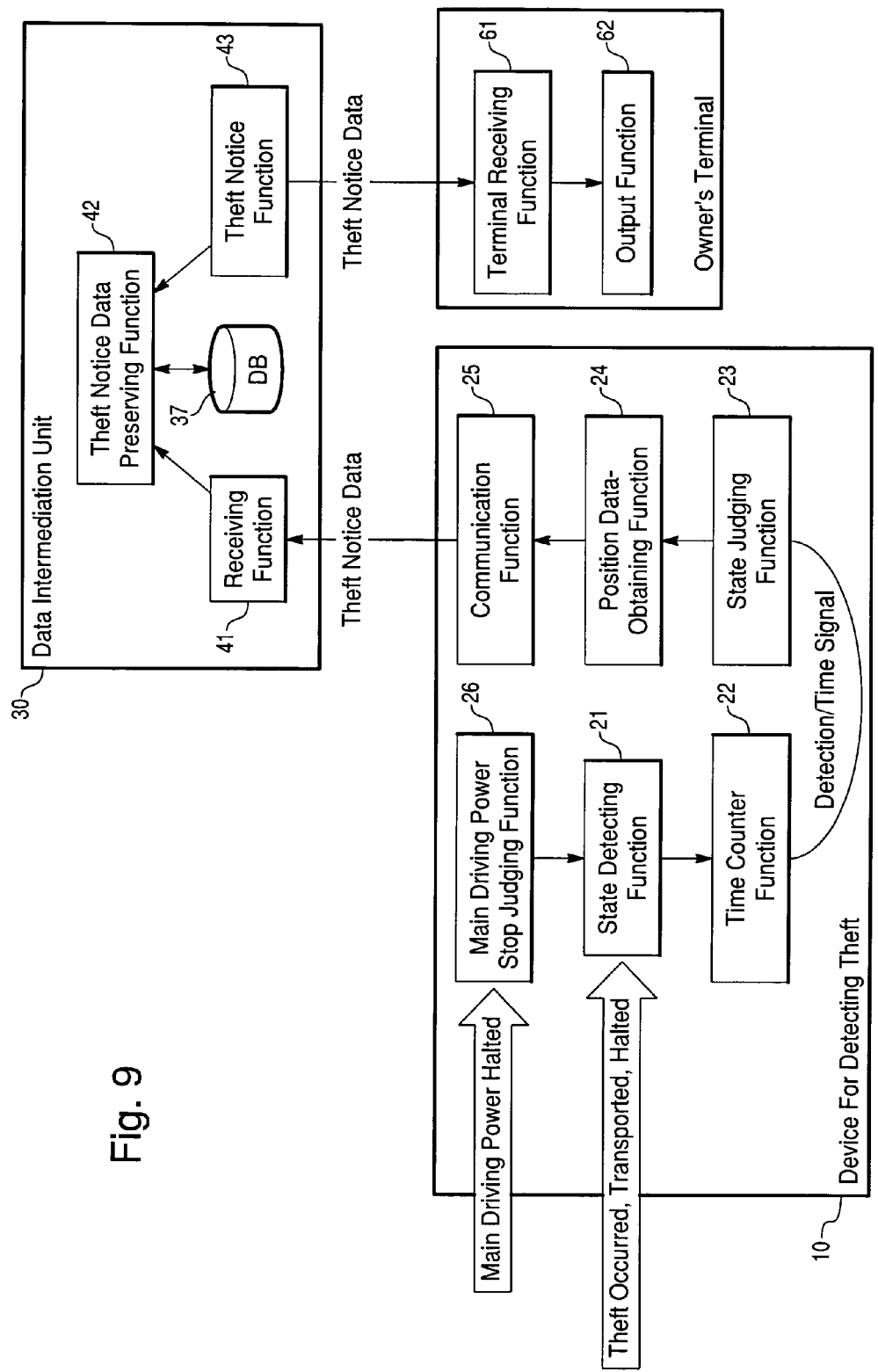
FIG. 9 is a functional block diagram of an embodiment of the system according to the present invention.

FIG. 9 is a diagram illustrating the hardware of the system for detecting the theft and functions realized by software running in the hardware. First, the functions of the device 10 for detecting the theft will be described. A function 26 for judging the stop of the main driving power is the one for judging that the speed of the automobile 1 has become 0 and that the engine has come into a halt. It further judges such a behavior that the owner has left the site in a state where the vehicle is stationary, e.g., the owner of the automobile 1 has got off the automobile 1 and locked the doors. The function 26 for judging the stop of the main driving power is realized by the vehicle speed sensor 75 and various sensors inclusive of a lock sensor that is not shown.

A state detecting function 21 is the one for detecting the automobile 1 that is being transported or is in a halted state under the condition where it is judged that the engine is at rest by the function 26 for judging the stop of the main driving power, by using various sensors. Any means may be employed provided it is capable of discriminating the state where the automobile 1 is being transported and the state where it is stationary. Time counter function 22 counts the time for which a signal is produced from the state detecting function 21.

A state judging function 23 judges the state of the automobile 1 based on the signals output from the state detecting function 21 and the time counter function 22. For example, when a signal representing that the automobile 1 is being transported is input to the state judging function 23 from the state detecting function 21 in a state where the main driving power is at rest, it is, then, so judged that "the automobile 1 is stolen and is being transported." Then, when a signal representing that the automobile 1 is stationary, is input to the state judging function 23 from the state detecting function 21, it is, then, so judged that "the transport of the automobile 1 has been finished." When a series of judgements are rendered by the state judging function 23, i.e., "the automobile 1 is stolen and is being transported," "the transport of the automobile 1 has been finished" as described above, then, a position data-obtaining function 24 operates.

The position data-obtaining function 24 obtains, through GPS, PHS or the like, the position data of the automobile 1, i.e., the data for specifying a position on an administrative section, such as physical position where the automobile 1 is present like longitude, latitude, position on the road or address. The position data may be typified as "139 degrees 44 minutes 46 seconds East latitude, 35 degrees 39 minutes 57 seconds North longitude," "Kyoto-shi, Shimokyo-ku, Shiokoji-dori, Horikawa-Higashi Hairu." Then, the position data-obtaining function 24 produces the theft notice data inclusive of the position data.

A communication function 25 transmits the theft notice data to the data intermediation unit 30 by communication. Any means may be employed provided the data are correctly transmitted to the data intermediation unit 30. In FIG. 7, the communication function is represented as being one-way. The communication function, however, may be bi-directional inclusive of a function for sending an instruction to the automobile 1 from the owner or the like through the data intermediation unit 30.

Next, described below are various functions of the data intermediation unit 30. A receiving function 41 receives the theft notice data transmitted from the device 10 for detecting the theft of the vehicle. There can be employed any means if it is capable of correctly receiving the theft notice data. A theft notice data preservation function 42 preserves, in DB 37, the theft notice data obtained through the receiving function. A theft notice function 43 transmits the theft notice data held by the data intermediation unit 30 to the owner's terminal 60. In fact, any transmission means/arrangement can be employed provided it is capable of correctly transmitting the theft notice data.

Usually, the data intermediation unit 30 is realized by a computer having a server function. The data intermediation device 30 may be installed at any place provided its function is connected to a network such as the internet. It may be, for example, an automobile monitor center or a server management company. It may further exhibit a data intermediation function as a home server function installed in the individual households.

Next, described below is a function of the owner's terminal 60.

A terminal receiving function 61 is the one for receiving the theft notice data transmitted from the data intermediation unit 30. Any means may be employed provided it is capable of correctly receiving the theft notice data. An output function 62 expresses the position data obtained through the terminal receiving function 61 in a form that can be comprehended by the owner, such as voice data or character/picture data displayed on a screen.

In this invention, it is desired that the theft notice data are obtained through such means as PHS (personal handy-phone system) or a cell phone. Nowadays, the position data of the vehicle can be obtained by using the PHS or the cell phone which is a generally employed communication means without requiring any particular device. It can be further utilized in a place where the electromagnetic waves from the GPS fail to reach, such as among the buildings and/or underground parking or the like.

Although the embodiment has illustrated the flow of data in one direction from the theft detecting device 10 to the owner's terminal 60, the theft detecting system is in no way limited to the one-way system only but may be a bi-directional the theft detection system which makes it possible to request the data related to the present state of the automobile 1 from the owner's terminal 60 and to control the theft detection device 10.

Next, the processing of the theft detecting system will be described with reference to a flowchart.

Figure 10:
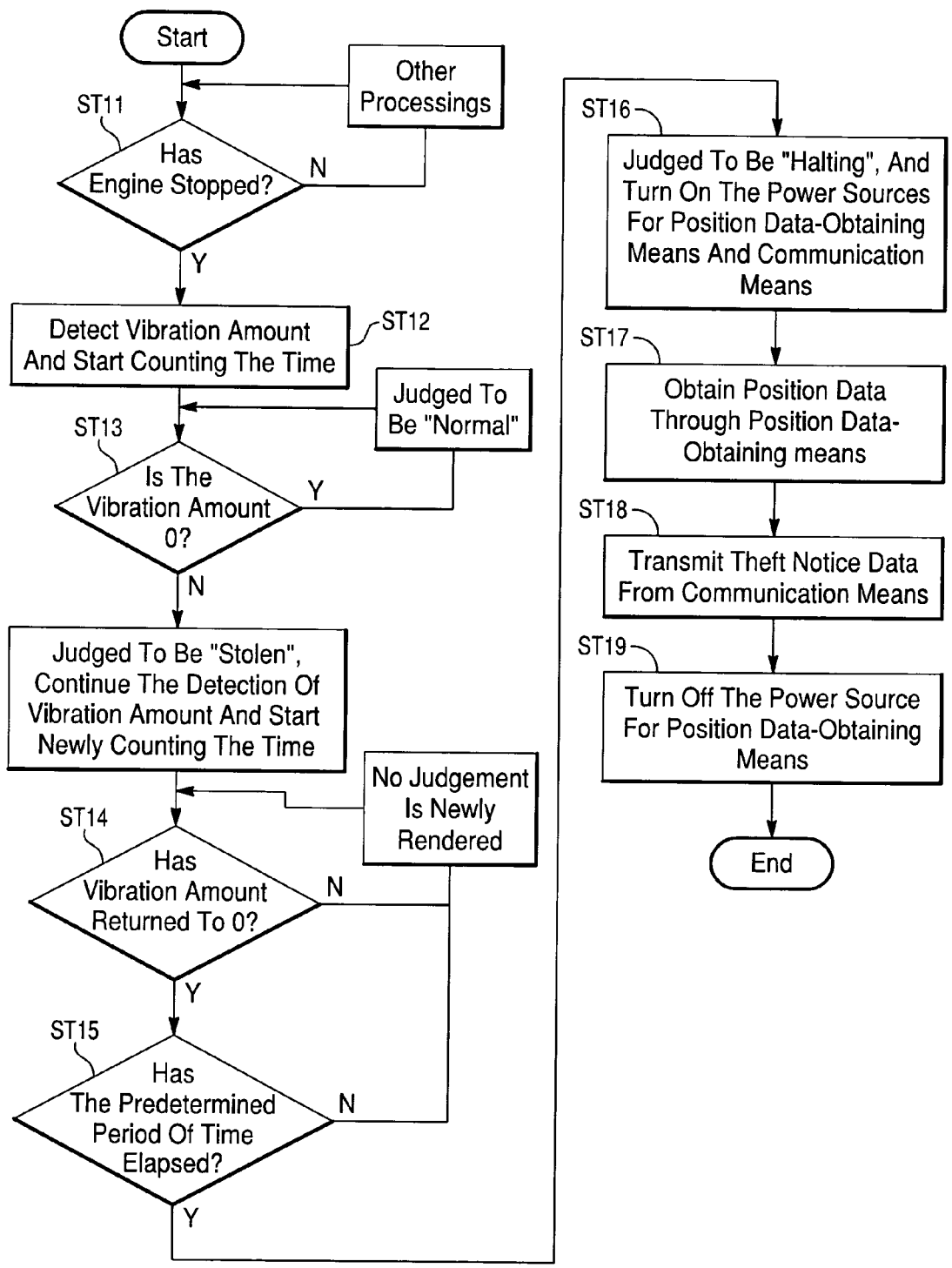
FIG. 10 is a flowchart illustrating processing implemented by the embodiment of the invention shown in FIG. 9.

FIG. 10 is a flowchart illustrating the processing of up to the transmission of the theft notice data from the theft detecting device 10. First, the stoppage of the automobile engine is detected at ST11. Next, at ST12, the vibration amount applied to the automobile 1 is detected by the state detecting means 11 (e.g., vibration sensor 71) in a state where the engine of the automobile 1 is at rest. At the same time, time counter means 12 counts the time for which signals corresponding to the vibration amount are produced. When the vibration amount continues to be 0 at ST13 after the engine has been stopped, the state judging means 13 renders the judgement "normal," and the detection continues at ST12. When the vibration amount other than 0 is detected at ST13, the state judging means 13 renders the judgement "stolen."

When the vibration amount becomes 0 (zero) again at ST14 and then continues to be zero for longer than a predetermined period of time at ST15, an electric power is supplied to the position data-obtaining means 14 and to the communication means 15 at ST16 to energize them. At ST17, the position data-obtaining means 14 obtains the position data from the position data offering means 50. At ST18, the position data obtained at ST17 are transmitted from the communication means 15 to the data intermediation unit 30 outside of the automobile 1. At ST19, the power source for the position data-obtaining means 14 is turned off.

FIG. 11 is a flowchart illustrating the processing of the data intermediation unit 30. When the theft notice data are transmitted from the automobile 1 at ST21, first, the data are received and preserved at ST22. At ST23, the theft notice data are transmitted so as to be notified to the owner. When it is confirmed at ST24 that the abnormality notice data have been transmitted to the owner, such as receiving a reply that the owner has confirmed the notice of the theft, the processing ends. In the case the theft notice data have not been transmitted to the owner, the data are transmitted again. This is repeated until a response is obtained from the owner's terminal.

In this theft detecting system, the theft notice data are transmitted to the owner and the like for the first time after the stolen automobile 1 that was transported, has come to a halt. It is, however, also allowable to energize the position data-obtaining means 14 and the communication means 15 for only a predetermined period of time to transmit the theft notice data inclusive of the position data that is obtained when the state judging means 13 has rendered the judgement "abnormal condition has occurred on the automobile 1" upon having detected abnormal condition such as vibration or shock that occurs on the automobile 1 by the state detecting means 11, which is earlier in time than the above transmission. The battery bears no large burden as long as the above predetermined period of time is short. The owner knows that the automobile was stolen from the place where he parked his vehicle. Therefore, the electric current may not be supplied to the position data-obtaining means 14 but may be supplied to the communication means 15 only so that "occurrence of abnormal condition" only is transmitted as the theft notice data. Namely, the owner and the like are informed of a condition in a state where an abnormal condition is just occurring in the automobile, and are allowed to confirm the condition at a position where the automobile 1 is parked before the automobile 1 is transported, to possibly prevent the theft. This additional means/ arrangement may be used in combination to the degree that over discharge of the battery is not of a problem.

According to the invention as described above, the position data-obtaining means that consumes large amounts of electric power is not operated at all times from the time the theft attempt was made but is operated after it is so judged that the stolen vehicle is transported and is, then, transported no more. This minimizes the discharge of the battery and makes it possible to transmit the position data of the vehicle to the owner and the like even after the passage of considerably long periods of time from the occurrence of the theft. Besides, the vehicle is stationary after it was transported. It is therefore highly probable that the stolen vehicle is at a location where the transport has finished, offering highly practicable chances of discovering the vehicle.

Even though the invention has been described with reference to only a limited number of embodiments, the number of variations and modifications that can be made without departing from the scope of the invention, which is limited only by the appended claims, will be readily self-evident to those of skill in the art to which the invention pertains/most closely pertains.

What is claimed is:

1. A device for detecting the theft of a movable member that is stolen using a transporter for transporting the movable member in a state where the main driving power of the movable member is at rest, the device for detecting the theft comprising:
    a state detecting arrangement for detecting a parameter indicative that the movable member is being transported or is stationary;
    a state judging arrangement for judging a state of the movable member as being stolen, based on signals from the state detecting arrangement;
    position data-obtaining arrangement for obtaining the position data of the movable member from a unit outside of the movable member, the position data-obtaining arrangement being connected with a source of electrical energy and enabled to obtain the position data only when the state judging arrangement has judged that the movable member is stolen and is being transported with its main driving power at rest and is, then, transported no more; and
    a communication arrangement for transmitting the position data that is obtained to the unit outside of the movable member.

2. A device for detecting the theft according to claim 1, wherein:
    the state detecting arrangement includes:
    a transport detecting arrangement capable of detecting whether the movable member is being transported or is stationary and producing an output indicative thereof, and a time counter function, and wherein:
    the state detecting arrangement determines that the transportation has ceased when a predetermined period of time has passed from the time that the output of the transport detecting arrangement assumes a zero value.

3. A device for detecting the theft according to claim 1, wherein the state detecting arrangement is capable of detecting whether the movable member is being transported or is stationary to produce an output by relying on at least two transport detecting sensor arrangements and a time counter arrangement, and wherein it determined that the transportation has ceased when a predetermined period of time has passed from the time it is detected that the vehicle is stationary based on outputs from the plurality of detecting sensor arrangement.

4. A method of detecting the theft of a movable member that is stolen using a transporter for transporting the movable member in a state where the main driving power of the movable member is at rest, comprising:
    detecting a parameter indicative of the movable member being transported or being stationary using a state detecting arrangement;
    obtaining position data of the movable member from a position data-obtaining arrangement from a unit outside of the movable member only when it is determined by the state judging arrangement that the movable member is stolen and is being transported with its main driving power at rest and is, then transported no more, based on the detected parameter; and
    transmitting the obtained position data using the communication arrangement to a unit outside of the movable member.

5. A device for detecting the theft according to claim 1, wherein, in order to conserve the source of electrical energy, the communication arrangement connected with the source of electrical energy and enabled to transmit the position data for a predetermined limited period of time.

6. A device for detecting the theft according to claim 1, wherein, in order to conserve electrical energy in the source of electrical energy, the position data-obtaining arrangement is connected with the source of electrical energy for a predetermined short period of time.

7. A method according to claim 4, further comprising energizing the position data obtaining arrangement via connection with a source of electrical energy for a predetermined short period of time to conserve the source of electrical energy.

8. A method according to claim 4, further comprising energizing the communication arrangement via connection with a source of electrical energy for a predetermined short period of time to conserve the source of electrical energy.

* * * * *